United States Patent
Harrington

[11] 3,731,127
[45] May 1, 1973

[54] GENERATOR END TOOTH FLUX SHIELD

[75] Inventor: Dean B. Harrington, Ballston Lake, N.Y.

[73] Assignee: General Electric Company, Schenectady, N.Y.

[22] Filed: Oct. 19, 1971

[21] Appl. No.: 190,537

[52] U.S. Cl..................................310/254, 310/256
[51] Int. Cl................................................H02k 1/12
[58] Field of Search..............................310/254, 256

[56] References Cited

UNITED STATES PATENTS 1,645,070   10/1927   Pohl....................................310/256

FOREIGN PATENTS OR APPLICATIONS 220,362   8/1924   Great Britain........................310/256
431,047   12/1910   France................................310/256
842,039   7/1960   Great Britain.......................310/256

Primary Examiner—J. D. Miller
Assistant Examiner—Mark O. Budd
Attorney—William C. Crutcher et al.

[57] ABSTRACT

A shield for the end of a laminated dynamoelectric machine stator core to reduce penetration of the stray end region flux into the tooth portion of the stator core. The shield comprises electrically conductive material encircling the stator armature bars as they emerge from the slots comprising individual overlapped coils, or alternatively, radially spaced rings with interconnecting radial conductors between bars.

3 Claims, 6 Drawing Figures

PATENTED MAY 1 1973 3,731,127
FIG.1 FIG.2
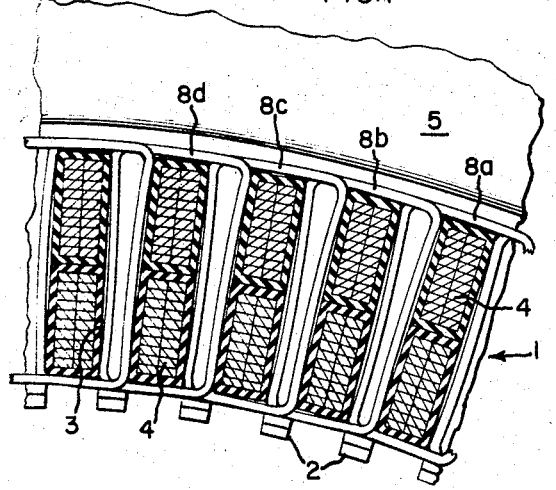
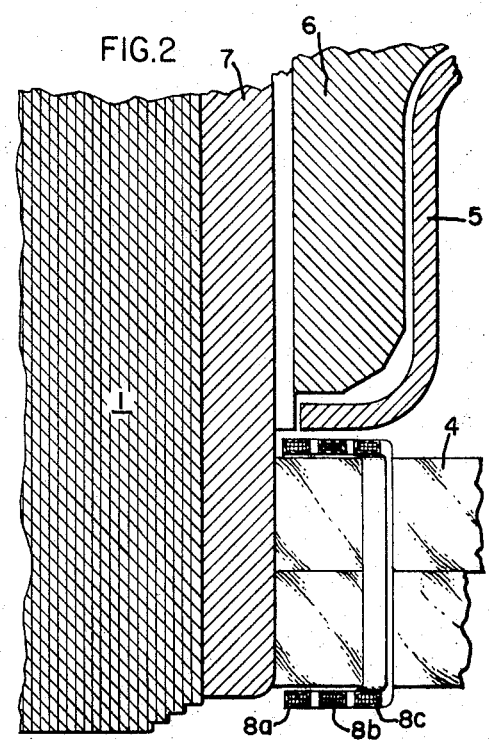
FIG.3
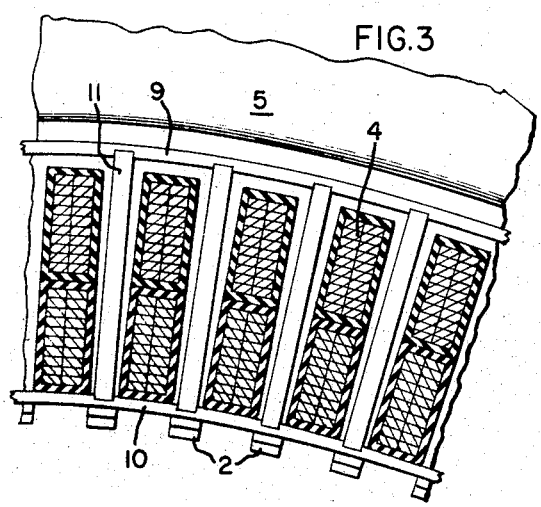
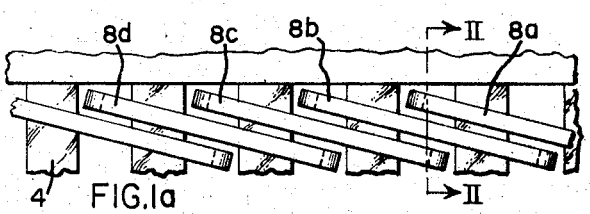
FIG.1a
FIG.4
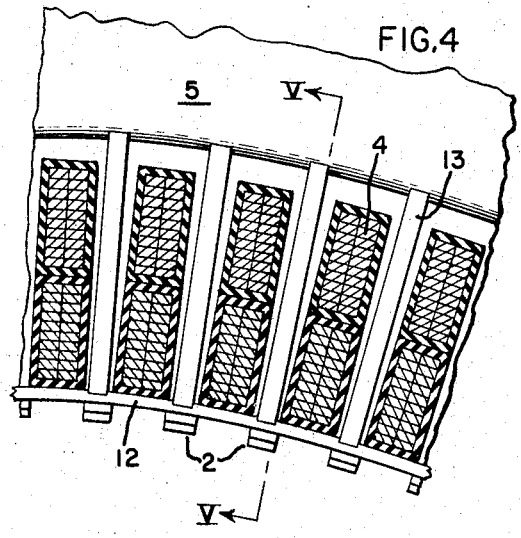
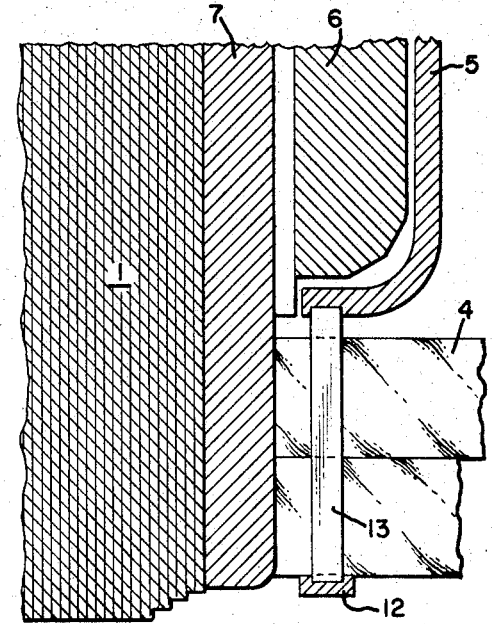
FIG.5

GENERATOR END TOOTH FLUX SHIELD

BACKGROUND OF THE INVENTION

The present invention relates to large dynamoelectric machines having laminated stator cores, and more particularly relates to an improved construction to control the stray flux in the end turn region of the machine so as to minimize the effects of axial flux penetration into the stator core.

In a large dynamoelectric machine such as a turbine-generator, the main synchronous flux produced by the rotating field winding follows paths in high magnetic permeability laminations disposed transverse to the rotor axis so as to link with the main winding disposed in slots in the stator core. In the end turn region, where the armature bars emerge from the stator core and follow a complex configuration, stray flux both from the rotor field winding and from the currents flowing in the armature bars follows undesired patterns. This stray flux has axial components tending to penetrate both the "yoke" portion and "toothed" portion of the stator core causing undesirable heating and other losses.

Constructions have long been known which step back the main stator core laminations at the end of the core to minimize overheating by establishing a better path for the flux in a radial direction. R. Pohl in U.S. Pat. No. 1,689,187 has suggested additional stepped-back laminations outside of the main core laminations extending over the tooth region of the core, and R. A. Baudry in U.S. Pat. No. 2,795,714 has suggested similar stepped-back laminations outside of the main windings in the yoke portion of the core. The foregoing types of construction are known herein as a "flux shunt" because they are made of material having a high magnetic permeability and the stepped laminations tend to collect and redivert magnetic flux in shunt with or parallel to the main synchronous flux in a plane transverse to the rotor axis.

Constructions have also been known in the prior art and in use by the applicant's assignee which employ a "flux shield." This is typically a copper annulus shaped to conform to the contour of the iron clamping flange holding the laminations in place. The shield is a conductive member of low magnetic permeability and arranged to produce circulating currents therein which form a shielding magnetic field diverting the stray flux away from the stator core.

Although the foregoing constructions are effective for the yoke portion of the core, they are less effective in toothed portion of the core between the armature bars which leads to undesirable overheating. With larger ratings of dynamoelectric machines, it is essential to protect the toothed portion of the core as effectively as the yoke portion of the core.

Accordingly, one object of the present invention is to provide an improved construction for the end of a dynamoelectric machine stator core to reduce the penetration of stray leakage flux into the toothed portion of the core.

Another object of the invention is to provide an improved construction for a flux shield which reduces the axial fringing flux entering the end region.

SUMMARY OF THE INVENTION

Briefly stated, the invention is practiced by providing a shielding arrangement of electrically conductive components surrounding the armature bars emerging from the stator core to provide paths for circulating currents creating an electromagnetic field to oppose the stray flux in the toothed region. The arrangement may include separate overlapped coils or an integral conductive framework.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is an end view of a portion of the end region of a dynamoelectric machine stator core, FIG. 1a is a fragmentary view of the same end region, looking radially outward, FIG. 2 is a cross section through a portion of the stator core and end region, taken along lines II—II of FIGS. 1 and 1a, FIGS. 3 and 4 are end views similar to FIG. 1 of modified forms of the invention, and FIG. 5 is a cross section of the FIG. 4 embodiment taken along lines V—V of FIG. 4.

DESCRIPTION OF THE PREFERRED EMBODIMENT

Referring to FIG. 1 of the drawing, the laminated stator core 1 of a large generator includes radially extending teeth 2 which form slots 3 between them. In slots 3 in a conventional two-layer lap winding made up of the individual armature bars 4 shown here as they emerge from the slots. Wedges (obscured in the drawings) hold the winding in place. A flux shield 5 is an electrically conductive continuous copper annulus protecting the yoke portion of the stator core from stray end region flux by forming a path for circulating currents which establish electromagnetic fields tending to cancel those of the stray flux in the end region.

Referring to FIG. 2, which is a cross section of FIG. 1, the conventional portion of the construction includes a flange ring 6 which is drawn against the stator core 1 to compress the laminations tightly in place; spacer bars 7 extending radially between armature bars 4 serve to transfer the force against the teeth. The flux shield 5 is an annular member contoured to follow the general configuration of flange ring 6.

The above-described construction is conventional. Referring to FIGS. 1, 1a and 2 of the drawing in accordance with the present invention, an array of coils 8a, 8b, 8c and 8d are arranged to loop around one or more pairs of armature bars as they emerge from the slots. If two or more pairs of armature bars are enclosed, then these coils will form an overlapping pattern. The coils are insulated from one another and suitably cooled to carry the necessary current. This cooling may be "conventional" permitting the heat to pass out through the insulation, or conductor cooling may be employed by employing hollow conductors and passing cooling fluid within the conductors in a known manner. Although only a portion of the stator is shown, these coils are continued all the way around the periphery of the stator and on both ends.

Referring to FIG. 1a, the coils 8a–8d are shown as lapped, so that the radial coil-sides of overlapping coils overlap at each tooth. In this manner the coil-side currents will produce a concentrated opposing flux to the impinging end region flux.

Referring now to FIG. 3 of the drawing, a modification of the invention is illustrated. Instead of the array of separate coils used in FIGS. 1 and 2, an integral frame of electrically connected components is substituted. The frame comprises an outer ring 9 disposed radially outward of the outermost armature bars 4 and an inner ring 10 inside of the innermost armature bars. Rings 9, 10 are electrically connected by a number of conductive radial members 11 extending between bars 4. The frame may be insulated if desired and cooled either by conventional means or employment of internal fluid cooling passages.

FIG. 4 is an alternate modification, wherein an inner ring 12 is electrically connected to the flux shield 5 by longer radial members 13. In this arrangement, the flux shield 5 serves as a substitute for the outer ring 9 of FIG. 3.

FIG. 5 shows the cross section of FIG. 4 to illustrate the manner in which the radial members 13 connect the flux shield and ring 12. Members 13 may be brazed or otherwise electrically connected between the members after the bars have been assembled in the slots.

OPERATION

In operation, stray flux from the end turn region induces circumferential circulating currents in the coils 8a–8d of FIGS. 1, 1a and 2 or in the closed paths formed by the rings and radial members of FIGS. 3–5. The resulting electromagnetic field caused by the circulating currents opposes the longitudinally entering flux to divert it away from the toothed portion of the core between armature bars 4. In FIGS. 1, 1a and 2, and in FIG. 3, the circulating currents are induced separately from similar circulating currents in the flux shield 5 but act in the same way. In the FIGS. 4 and 5 arrangement, the radial members 13 and ring 12 serve to form an extension of the flux shield 5 which performs in a known way, except that "windows" are provided by the construction for the armature bars 4 to leave the slots.

Thus, the disclosed generator end tooth flux shield serves to protect the toothed portion of the core so as to reduce losses in the teeth of the end packages of the stator core by reducing the axial fringing flux entering from the end region.

While there has been described herein what is considered to be the preferred embodiment of the invention, it is intended to cover in the appended claims all such modifications as fall within the true spirit and scope of the invention.

What is claimed is:

1. In a dynamoelectric machine having a laminated stator core defining a toothed portion carrying main windings which emerge from slots between said teeth into an end region, a flux shield comprising:

a plurality of electrically conductive separate coils each surrounding selected portions of said main windings adjacent the location where they emerge from said slots, and forming closed electrically conductive paths around said main windings, whereby circulating currents will be induced to oppose flux entering said toothed portion from the end region.

2. The combination according to claim 1, wherein said coils encircle at least a pair of said main winding emerging portions, said coils being disposed in an overlapping array around the stator core.

3. The combination according to claim 2, wherein the coil-sides of said overlapped coils are arranged to overlap at each tooth, whereby the coil-side currents produce a concentrated opposing flux to the impinging end flux at each tooth.

* * * * *